United States Patent
Hulsken et al.

(10) Patent No.: US 10,353,190 B2
(45) Date of Patent: Jul. 16, 2019

(54) SENSOR FOR MICROSCOPY

(75) Inventors: Bas Hulsken, Eindhoven (NL); Sjoerd Stallinga, Delfgauw (NL)

(73) Assignee: Koninklijke Philips N.V., Eindhoven (NL)

( * ) Notice: Subject to any disclaimer, the term of this patent is extended or adjusted under 35 U.S.C. 154(b) by 785 days.

(21) Appl. No.: 13/519,360

(22) PCT Filed: Dec. 22, 2010

(86) PCT No.: PCT/IB2010/056005
§ 371 (c)(1),
(2), (4) Date: Jun. 27, 2012

(87) PCT Pub. No.: WO2011/080670
PCT Pub. Date: Jul. 7, 2011

(65) Prior Publication Data
US 2012/0287256 A1 Nov. 15, 2012

(30) Foreign Application Priority Data
Dec. 30, 2009 (EP) .................................. 09306350

(51) Int. Cl.
*H04N 7/18* (2006.01)
*G02B 21/36* (2006.01)
*G02B 21/24* (2006.01)

(52) U.S. Cl.
CPC ......... *G02B 21/367* (2013.01); *G02B 21/241* (2013.01); *G02B 21/361* (2013.01)

(58) Field of Classification Search
CPC ... G02B 21/361; G02B 21/241; G02B 21/367
(Continued)

(56) References Cited

U.S. PATENT DOCUMENTS 4,896,336 A  1/1990  Henely et al.
6,825,454 B2 11/2004 Czarnetzki et al.
(Continued)

FOREIGN PATENT DOCUMENTS

DE  10127284 A1  12/2002
EP   2031428 A1   3/2009
(Continued)

OTHER PUBLICATIONS

Ying, Xiaoyou et al "Modern Imaging Technologies in Toxicologic Pathology: An Overview" Toxicologic Pathology, vol. 34; pp. 815-826, 2006. vol. 34; pp. 815-826, 2006.
(Continued)

*Primary Examiner* — Matthew K Kwan

(57) ABSTRACT

This invention pertains to a method for microscopically imaging a sample, with a digital scanner comprising a sensor including a 2D array of pixels and to a digital scanning microscope carrying out this method. It is notably provided a method for microscopically imaging a sample with a scanner comprising a sensor including a 2D array of pixels in an XY coordinate system, the axis Y being substantially perpendicular to the scan direction, wherein the scanner is arranged such that the sensor can image an oblique cross section of the sample, and wherein the method comprises the steps of: • activating a first sub-array of the 2D array of pixels, the first sub-array extending mainly along the Y axis at a first X coordinate (X1), • creating a first image by imaging a first area of the sample by means of the first sub-array of pixels. According to aspects of the invention, it is further proposed a scanner carryout this method and using the same 2D array sensor for imaging and auto-focusing purpose.

21 Claims, 6 Drawing Sheets

(58) Field of Classification Search
USPC .......................................................... 348/79
See application file for complete search history.

(56) References Cited

U.S. PATENT DOCUMENTS

| | | |
|---|---|---|
| 7,369,304 B2 | 5/2008 | Maenle et al. |
| 7,454,133 B2 | 11/2008 | Takahashi |
| 7,457,446 B2 | 11/2008 | Soenksen |
| 7,473,877 B2 | 1/2009 | Fomitchov |
| 7,706,584 B2 | 4/2010 | Saggau et al. |
| 8,059,338 B2 | 11/2011 | Ptitsyn et al. |
| 8,179,599 B2 | 5/2012 | Jansen |
| 8,515,528 B2 | 8/2013 | Graser et al. |
| 9,386,211 B2 | 7/2016 | Soenksen |
| 2003/0156323 A1 | 3/2003 | Liang et al. |
| 2005/0089208 A1* | 4/2005 | Dong .................. G02B 21/241 382/133 |
| 2006/0146151 A1 | 7/2006 | Moon |
| 2006/0268145 A1 | 11/2006 | Moon |
| 2007/0152130 A1 | 7/2007 | Fomitchov |
| 2009/0059362 A1 | 3/2009 | Jansen |
| 2009/0231689 A1* | 9/2009 | Pittsyn et al. ................ 359/363 |
| 2009/0295963 A1* | 12/2009 | Bamford et al. ............ 348/302 |
| 2012/0287256 A1 | 11/2012 | Huisken et al. |

FOREIGN PATENT DOCUMENTS

| | | |
|---|---|---|
| JP | H0821961 A | 8/1994 |
| JP | H11211439 A | 8/1999 |
| JP | 2002365524 A | 6/2001 |
| JP | 2002365524 A | 12/2002 |
| WO | 200184209 A2 | 11/2001 |
| WO | 2004038461 A2 | 5/2004 |
| WO | 2007095090 A2 | 8/2007 |
| WO | 2008125204 A1 | 10/2008 |
| WO | 2008137746 A1 | 11/2008 |

OTHER PUBLICATIONS

Goodman, Ron et al "Synthetic Aperture Radar Algorithms" Handbook of Image and Video Processing, Elsevier Publications. pp. 1131-1153, 2005.

* cited by examiner

SENSOR FOR MICROSCOPY

FIELD OF THE INVENTION

This invention relates to the field of digital scanning microscopes, and applies advantageously in the field of digital pathology.

In particular this invention relates to a method for microscopically imaging a sample, with a digital scanner comprising a sensor including a 2D array of pixels and to a digital scanning microscope, also called scanner herein after, carrying out this method.

BACKGROUND OF THE INVENTION

A digital scanning microscope usually makes a digital image of a sample such as a tissue sample placed in a microscope slide.

This is typically done by scanning the sample over the whole microscope slide and stitching different image bands together and/or by overlaying images measured at different wavelengths.

FIG. 1 schematically represents a cross-section of such a microscope slide. It notably comprises a glass slide 1 with a typical thickness of 1 mm (millimeter), a cover slip 2 with a typical thickness of 0.17 mm, a mounting medium 3 for fixing and sealing off a sample 4 like a tissue layer. The thickness of the sample 4 can typically be around 5 m, and for the mounting layer including the sample around 10 to 15 μm.

It is known, for example from WO2001084209, that digital scanning microscopes can comprise a 1D line sensor, also known as a line scan camera or as a linear array sensor. Such sensors comprise only one line, said differently one row, of sensing pixels. It is also known that compared to other types of sensors, like 2D array sensors for example, 1D line sensors are able to provide better continuous mechanical scanning operation, less stitching problems, and can allow for the use of so-called Time Delay Integration (TDI) line sensors.

In general, such 1D line sensors need to be combined with an efficient autofocus system in order to achieve good quality images of samples which position along the Z axis (depth direction) may vary of several microns (which can be more than the focal depth of the microscope). It is to be noted that such requirement is really important here, notably because the use of such sensors inherently requires a high number of scan increments during the image acquisition of the whole sample and thus involves an increase of focus adjustments during the scan.

In this respect, WO2001084209 discloses the most common solution known in the art which consists in generating and using a focus map. Such focus map provides measured optimum focus position to be used for the scanner objective in accordance with different scan positions along the scan path. The focus map is created prior to an actual image acquisition of the sample and made available for use any such acquisition process. During a scan process of acquiring the image of the sample, the focus position of the scanner objective is set on a trajectory that interpolates between the measured optimum focus positions.

SUMMARY OF THE INVENTION

The inventors of the present invention have realized that, despite providing some advantages, the combination of a 1D line sensor with autofocus based on focus map can have several drawbacks.

For instance, the need of such focus maps may limit the overall throughput time of the scanner (the throughput time may typically refer to the overall time needed to output an image of the sample or in certain circumstances to output an image band of this sample) because as explained above, it requires at least one prior step of map generation. Further, the numerous focus adjustments required with a 1D line sensor may require the use of complex and cumbersome mechanical components to obtain fast and accurate image acquisitions. For example, complex and cumbersome actuators for adjusting the focus position of the objective during the scanning process may be required.

Further, due to focus errors, sometimes the scanning process itself should be rendered more complex. For example, it is sometimes needed to perform multiple acquisitions of the same sample area.

Thus, an object of the invention is to provide a new method and a new digital scanner which overcomes the above-mentioned problems.

In this effect, according to a first aspect of the invention, it is presented a method for microscopically imaging a sample with a scanner comprising a sensor including a 2D array of pixels in an XY coordinate system, the axis Y being substantially perpendicular to the scan direction, and wherein the scanner is arranged such that the sensor can image an oblique cross section of the sample.

More precisely this method comprises the steps of:
   a) activating a first sub-array of the 2D array of pixels, the first sub-array extending mainly along the Y axis at a first X coordinate, and
   b) creating a first image by imaging a first area of the sample by means of the first sub-array of pixels.

It should be noted here that, by substantially it is meant that axis Y preferably makes an angle of 90° with the scan direction, but that a slightly different angle could also be used. In fact, this angle should be such that the area swept by a single row of pixels during the scan is as large as possible. An optimum may result in the largest swept area, and thus the highest throughput of the scanning microscope may be obtained when the axis Y is exactly perpendicular to the scan direction. However, other design considerations could lead to a reasonable deviation. In particular, it may be reasonable to choose the angle in a range between 60 and 120 degrees. Indeed, such a range still provides a throughput of at least 87% (relative throughput is equal to cosinus(90−60)) of the maximum throughput of the scanner.

Thus, according to the invention, a 2D array sensor is caused to act as an x-line sensor by using a limited selection (the sub-array) of its sensing area (the letter 'x' here refers to an integer number which as will be seen later is below the total number of lines in the 2D array sensor). Said differently, a 2D array sensor is caused to simulate the functionally and operation of an x-line sensor. And as will become clear herein after, using such a simulated x-line sensor in a scanner arrangement where the cross section of the sample can be imaged by this sensor, allows various advantages such as to overcome the above-mentioned problems. Among others, a scanning imaging system is provided with efficient change of focus depth during scanning.

In preferred embodiments of the invention the x-line sensor is a 1D line sensor. The first sub-array thus includes one line of pixels. If it is used in a scanning process, the X position of the line is regularly adjusted during the scan to updated positions at which the scanner determines that the line will be in focus. In preferred embodiments, the 2D array sensor, from which a first sub-array is used for example to act as a 1D line sensor, is used simultaneously to extract information from a larger focus range of the sample, in order to determine a desired focus position for the simulated line sensor. In this fashion a scanning imaging system is provided with an efficient autofocus and an efficient change of focus depth during scanning. In particular, the single 2D array sensor acts simultaneously as a 1D line sensor, and as a focus detector of an autofocus system. By simultaneous it is meant that image and focus information are captured at exactly the same time, or that they are captured in an interleaved fashion, with a sufficiently high duty cycle.

Other embodiments of the invention are as follows:
the method further comprises the steps of:
  scanning the sample,
  activating a second sub-array of the 2D array of pixels, the second sub-array extending mainly along the Y axis at a second X coordinate, different than the first X coordinate,
  creating a second image by imaging a second area of the sample by means of the second sub-array of pixels;
the method further comprises a step of building a composite image of the sample by combining the first and second images;
the method further comprises a step of providing the first coordinate;
the method further comprises a step of determining the first X coordinate such that the first sub-array is able to provide the first image at a predetermined focus;
the method further comprises a step of determining the first and second X coordinates such that the first and second sub-arrays are able to provide the first and second images at substantially equal focus;
the method further comprises:
  imaging a second area of the sample with a predetermined subset of pixels of the 2D array of said sensor, the subset being different than the sub-array of pixels, deriving focus information from this image, and
  determining the first X coordinate from the focus information;
the method further comprises activating the predetermined subset of pixels such that it extends mainly along the X axis with a rectangular shape;
the subset of pixels may be distributed over at least two distinct regions in the 2D array of pixels;
assuming that the sample has a certain thickness, the method comprises a step of providing an information about a depth within the thickness at which the first sub-array of pixels can image the sample at a predetermined focus, and a step of determining the first X coordinate, in accordance with this depth information;
the predetermined focus may correspond to a best in-focus;
the cross section of the sample may be oblique with respect to the scan direction;
the scanner may comprise a sample holder including a holding surface and the 2D array of pixels may lie substantially in a plane which makes a tilt angle with respect to said holding surface;
the 2D array sensor may be controlled to simulate a 1D line sensor by activating the first sub-array such that it comprises, along the Y axis, less than three rows of pixels, and preferably one row of pixels only, or to simulate a 1D N-stage TDI sensor by activating the first sub-array such that it comprises along the Y axis, in each stage, less than three rows of pixels, and preferably only one row of pixel only;

According to another aspect of the invention, it is presented a scanning microscope that carries out the method of the invention.

BRIEF DESCRIPTION OF THE FIGURES

These and other aspects and advantages of the invention will become more apparent upon reading the following detailed description of embodiments of this invention, given as a non-limiting example and made with reference to the attached drawings, in which.

DETAILED EMBODIMENTS OF THE INVENTION

Figure 1:
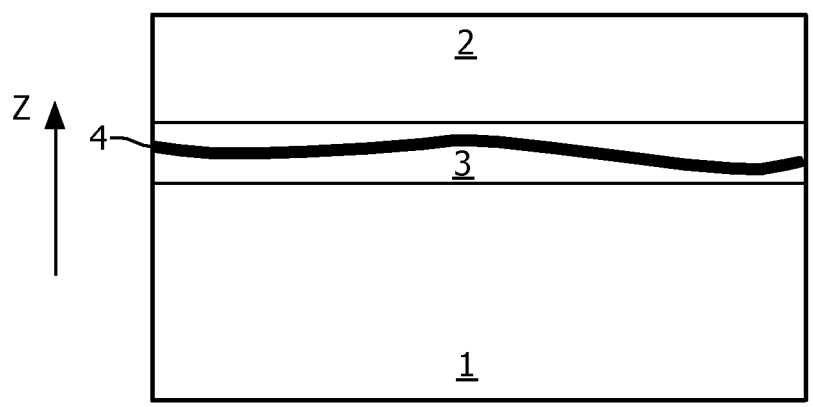
FIG. 1, already discussed, schematically illustrates a cross section of a tissue slide assembly.
Figure 2:
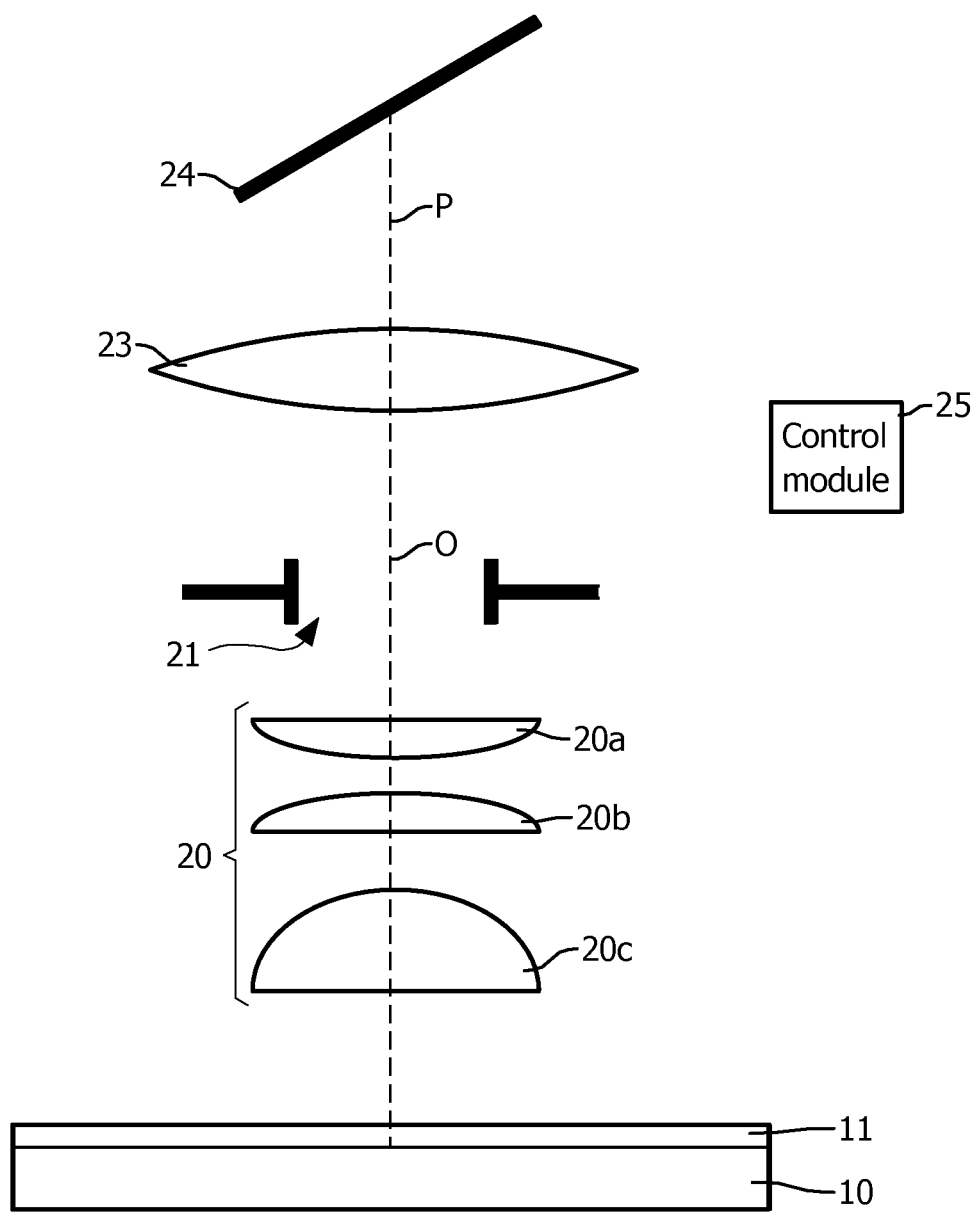
FIG. 2 schematically illustrates a scanning microscope according to embodiments of the invention.

A scanning microscope according to an embodiment of the invention is illustrated in FIG. 2.

This scanner is arranged for imaging a sample (e.g. a tissue layer not shown) which can be placed between a glass slide 10 and a cover slip 11.

Such a microscope slide is placed on a holding surface of a sample holder not shown in the figure.

As may be known in the art, along an imaging path P and starting from the microscope slide, the scanner may notably comprise a microscope objective 20, typically made of a plurality of lenses 20a, b, and c, an aperture 21 for blocking un-scattered reflected light from the tissue sample, a tube lens 23 and a sensor 24.

The sensor 24 comprises a 2D array of pixels, also referred herein as matrix of pixels. This sensor is typically a CMOS imaging sensor.

As can be seen from FIG. 2, the matrix of pixels is tilted with respect to the optical axis O of the microscope objective lens.

The scanner further comprises a control module 25 for controlling the operating process of the scanner, and in particular the scanning process for imaging the sample. The control module typically comprises a processor such as for example an FPGA (Field Programmable Gate Array) or a DSP (Digital Signal Processor).

As is known is the art, by using a light source in a so-called reflective or transmission mode a light spot can irradiate an area in the tissue layer. Light reflected or transmitted by this spot travels across the microscope objective lens, the aperture, the tube lens and is projected onto and detected by a sensing area of the sensor, i.e. a sensing area of the 2D array of pixels.

A non Cartesian coordinate system XYZ shown for example in FIG. 3, will be used herein after wherein the matrix surface extends over a plane parallel to the X and Y axis, and wherein axis Z may be perpendicular to axis X and Y.

As will be clear for a person skilled in the art, because the matrix of pixels is in the titled configuration described above, what is projected onto this matrix is an image of an oblique cross section of the sample, e.g. of the tissue layer. It may be noted here that it may be preferable that the image projected onto this matrix is sufficiently oblique with respect to the scan direction to ensure that image information of the sample from a sufficiently large range of depths around a central image plane is projected on the pixel matrix. The central image plane refers here to the plane in an object being imaged which is parallel to the scan direction and the Y axis. The central image plane is at a position in the sample such that, taking subsequent images from a sub array defined for example as a single full line of pixels (extending along the Y axis of the pixel matrix), at a position X along the X axis, closest to the middle of the pixel matrix, would yield an image of this central image plane.

Figure 3:
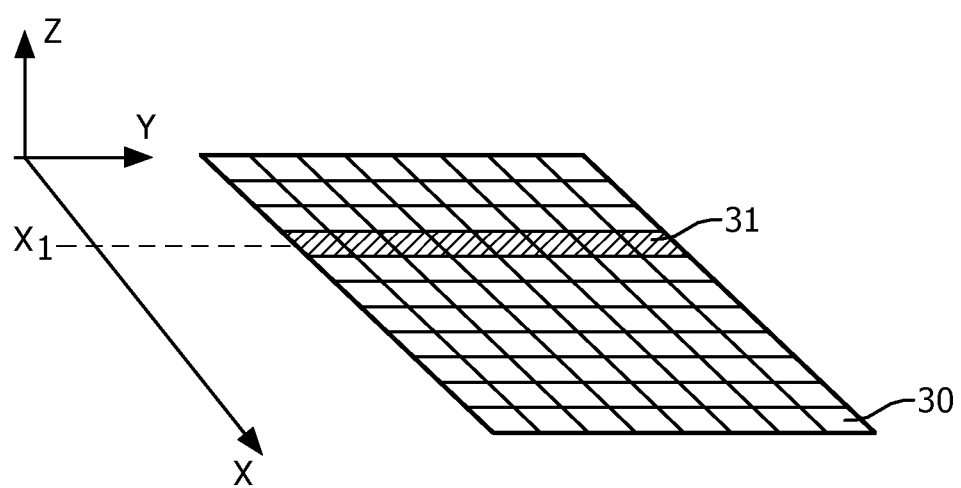
FIG. 3 schematically illustrates a 2D array of pixels of a sensor used in the scanning microscope of the invention.

Referring now to FIG. 3, a schematic illustration of the tilted pixel matrix of the sensor is shown.

Still for sake of a non limitative illustration, each pixel of the matrix, e.g. pixel 30, is represented by a square and FIG. 3 shows the total surface of this matrix.

As can be seen, the matrix surface extends over a plane parallel to the X and Y axis. In other words, the matrix has two dimensions (X,Y) which extend along the two axis X and Y of the system coordinates and which comprises a plurality of rows (or said differently, of lines) and a plurality of columns, respectively.

It is to be noted that axis Z can be parallel to the optical axis O and will notably be used in the following when referring for example to depth.

Further, the XYZ coordinate system can either be Cartesian or non Cartesian. As a result, the scan direction of the scanner can be perpendicular to the Z axis. However, in other embodiments the optical axis can be perpendicular to the pixel matrix. In this case the translation of the sample can be non parallel to the XY plane, so that an oblique section of the sample with respect to the scan direction is imaged on the pixel matrix.

According to embodiments of the method of the invention, the control module 25 activates a first sub-array of pixels 31 (dashed area in FIG. 3) within the pixel matrix of the sensor at a certain coordinate (e.g. X1 in FIG. 3).

It should be understood that, compared to a matrix in the sense of the invention, a sub-array should comprise a substantially lesser number of pixels. Preferably, the surface of a sub-array should represent less than one half of the total surface of the matrix. More preferably, the surface of a sub-array should represent less than one fourth of the total surface of the matrix.

In addition, it should be understood that a sub-array extending mainly along the Y axis should mean that the number of columns is substantially greater than that of rows. Preferably, such a sub-array includes all the pixels of one row and includes less than one third of the total number of rows of the matrix. More preferably, the sub-array includes all the pixels in one row and includes less than three rows. Even more preferably, the sub-array includes all the pixels in one row and includes one row only. Such configuration is represented as non limitative example in FIG. 3.

Turning back to the method according to the embodiment described above, the sub-array of pixels is sensitive to, and therefore detects the light projected from the sample.

Then the control module creates thereof a first image of a first area of said cross-section.

In order to build an image of a larger area the steps described above can be repeated while the sensor is scanned with respect to the microscope slide. In this case, at each scan position a new sub-array is designated and activated, and a new image of each new area in the cross-section of the sample is created. Then, from a combination of these images, the image of larger area may be created and called a composite image.

The X coordinate of the sub-array to be activated, for example X1 (see FIG. 3), can be provided and determined in various manners.

According to embodiments, the coordinates may be determined in relation to focus information.

In this regard, in a preferred embodiment the scanner utilizes the same 2D array sensor as described above for imaging and for continuous auto-focus.

By continuous, it is meant that autofocus is measured and controlled on the fly during the scanning process.

The scanner of this embodiment is able to obtain focus information, coordinates of the sub-array to be activated in order to be able to create an image at a predetermined focus (e.g. predetermined amount of de-focus or exactly in focus), and create this image, by using the same 2D array sensor.

Figure 4:
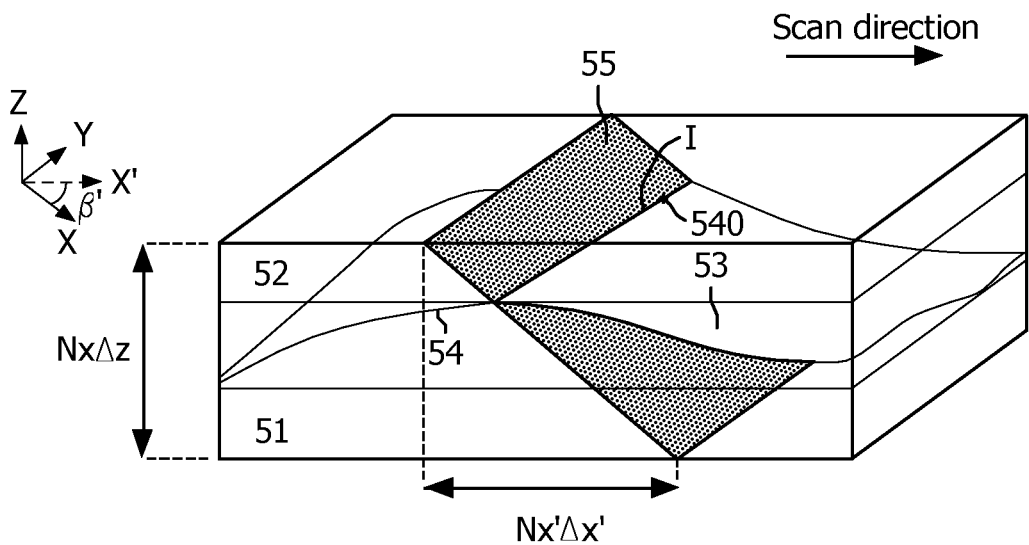
FIG. 4 schematically illustrates a tissue slide assembly and a projection of the 2D array of the scanning microscope of the invention.

This embodiment can rely on the following observations made by reference with FIG. 4 provided as non limitative example.

This figure illustrates again the microscope slide with the glass slide 51, the cover slip 52, and a mounting medium 53 including the tissue layer 54.

The coordinate system XYZ associated to the sensor is represented again, but together with a new non Cartesian coordinate system X'YZ associated to the overall scanner.

Assuming that the sensor makes a tilt angle $\beta'$ with respect to the surface of the holder (horizontal surface ideally), then axis X and X' make the same angle ' with respect to each other.

For clarification purpose, this figure further represents a projection 55 of the 2D array of pixels of the sensor into the microscope slide. This projection corresponds to what the sensor may actually detect and image from this microscope slide.

As explained before the 2D array sensor is able to make an image of the oblique cross section of the sample; the cross section virtually corresponds to the projection 55.

This oblique cross section 55 intersects with the tissue layer 54 at positions (see e.g. intersection I or position 540). As is clear, this intersection notably depends on the axial position of the tissue layer relative to the focal plane of the microscope objective lens. This is notably because, as FIG. 4 shows, the depth position (along Z) of the tissue layer 54 in the scan direction is not uniform.

It can be derived that, because an image of the entire oblique cross section can be projected onto the 2D array sensor, this cross section including the tissue layer 54 will always be in focus at some pixels in the 2D array of the sensor, namely at the pixels which are able to image the intersection I.

Figure 5A:
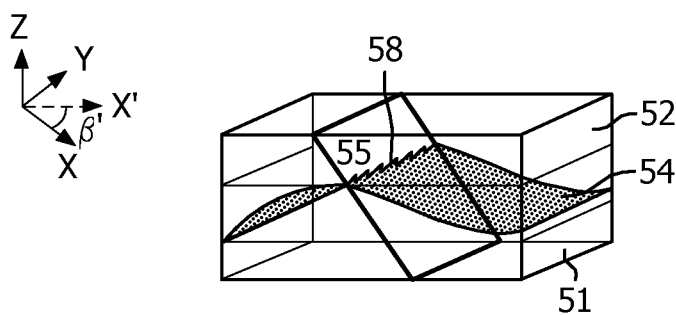
FIG. 5 schematically illustrate two situations where said projection intersects with a tissue layer at two different positions.

As is shown as an example illustrated in FIG. 5a, the closer from the cover slip 52 the tissue layer 54 will be, the more the position of the intersection will go to the left hand side of the 2D array of pixels (see intersection 58).

Note that in FIG. 5, left refers to a direction parallel to and opposite to vector X.

Figure 5B:
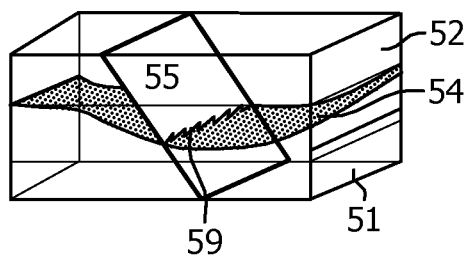

Conversely, as shown in FIG. 5b the closer from the glass slide 51 the tissue layer 54 will be, the more the position of the intersection will go to the right hand side of the 2D array of pixels (see intersection 59).

As a result, by determining the position, e.g. the coordinates, of the intersection within the matrix of pixels it is possible to determine which sub-array of pixels should be activated in order to image the corresponding sample area in focus.

Thus, as can be seen the scanner can use the same 2D array sensor for continuous auto focus as well as for imaging.

In embodiments of the invention, the autofocus of the scanning microscope is performed by means of a fixed number of pixels chosen within the 2D array of the sensor.

For sake of clarity, according to this invention, pixels used for autofocus will be designated by a subset of pixels while the sub-array defined above will designate pixels used for imaging.

By definition, a subset and a sub-array may differ substantially one another, notably with respect to the respective numbers or positions of pixels. However, they both can overlap within the matrix area. Of course, there might be situation where the area of the sample which is imaged is at a depth to which the sub-array could coincide with the subset. However, this situation might be exceptional and there might be at least a minor difference in pixel content between the two.

Figure 6:
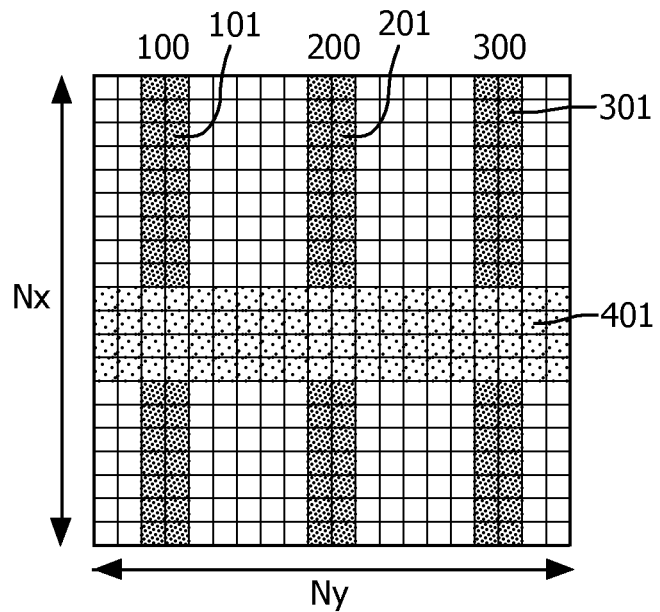
FIG. 6 schematically illustrates the 2D array of pixels, and notably shows a subset of pixels according to an embodiment of the invention.

FIG. 6 illustrates a first example of a subset according to this embodiment. In the matrix, this sub-array is distributed in three distinct regions 100, 200, 300. Three corresponding parts 101, 201, and 301 of the subset have each a rectangular shape by activation of 2 columns of pixels extending along the entire X dimension of the matrix.

Such a configuration can be used in the following method.

Figure 7:
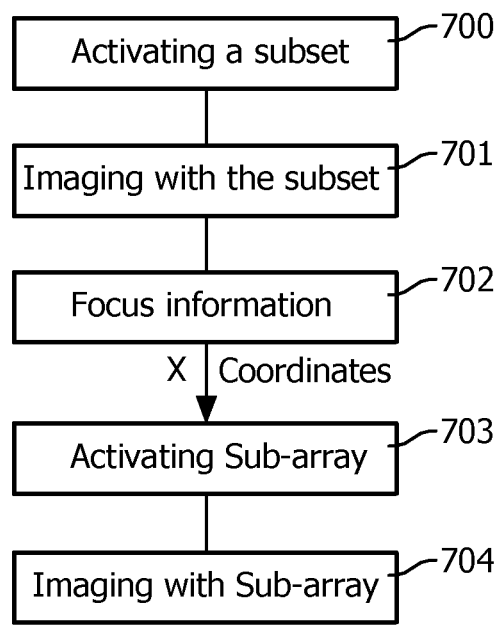
FIG. 7 illustrates a block diagram representing steps of a method according to embodiments of the invention.

By reference to FIGS. 6 and 7, the subset of pixels 101, 201, 301 is activated in step 700.

An image of three areas of the sample corresponding to the three parts of the subset is created in step 701.

Focus information is deduced from this image in step 702. For example, the control module 25 determines which pixel(s) of the subset have been able to capture an image in focus and deduces the corresponding row(s).

Such a determination can be done in various ways that the skilled person in the art will recognize easily. For instance, an algorithm may be used to analyze an image produced by the subset and to determine the focus characteristics. For example, the control module may execute an algorithm which analyzes sharpness in this image to determine focus characteristics at each pixel of the subset. As a row can be defined in the X and Y dimensions, the corresponding X coordinate(s) of relevant pixels are known by the scanner.

A sub-array of pixels is then designated for imaging. In the non limitative example of FIG. 6, the designated sub-array 401 makes a rectangle consisting of four lines of pixels. Therefore, four X coordinates may be provided. Alternatively, a single coordinate may be provided. This coordinate may allow the scanner to deduce the three others by any predefined relationship. For example, the single coordinate may correspond to a position at or nearest to the center of the width of the sub-array.

Once the sub-array is designated, the method further comprises a step 703 for activating it.

In step 704, a first image of the area in the sample corresponding to what the sub-array can image is created.

This method can be repeated in a scanning process used for imaging more area of the sample, and typically for imaging the whole surface of the sample.

In this case, the sensor may be moved according to the scan direction X' and relatively to the sample. Then the steps 700 to 704 may be executed again. As explained above, while the distance between the sample and the sensor changes during the scanning process, the sub-array moves correspondingly along the X dimension of the matrix to the coordinates where the intersections I take place, thereby keeping the sample in the desired focus. Additional images are created and combined as well known in the art, to end up with a composite image of the sample.

It may not be necessary to perform steps 700 to 702 at each position of the scan. Instead, there may be some positions were only steps 703 and 704 would be performed. In this case the last designated sub-array may be used again for imaging. An advantage here of not performing steps 700 to 702 for each image that is created, is that less of the available sensor bandwidth is used for obtaining focus information, leaving more bandwidth for the actual acquisition of the image, resulting in higher throughput of the scanner, at the cost however of a slower tracking of variations in desired focus position.

According to embodiments of invention, the number of rows of the sub-array is fixed during the whole scanning process, e.g. to 1 row for simulating a 1D line sensor, or to few more rows for enlarging the sensing area (FIG. 6 shows an example in which the width of the sub-array would be fixed to 4 rows).

Alternatively, the number of rows can be set dynamically during the scanning process.

As a non limitative example, this number may differ in function of the number of rows in the subset which have been determined to be able to provide an image at the predetermined focus, e.g. in focus. Thus, in some cases the width of the sub-array may differ during the scan.

In embodiments, the scanner may be set to let the shape of the sub-array conform to the shape of said intersection I. Accordingly, in these embodiments the shape of the sub-array could be of any form, such as bend, curved for example.

Further, in said alternative the maximum number of rows of the sub-array can be defined. According to embodiments of the invention, other subset configurations may be used.

Figure 8:
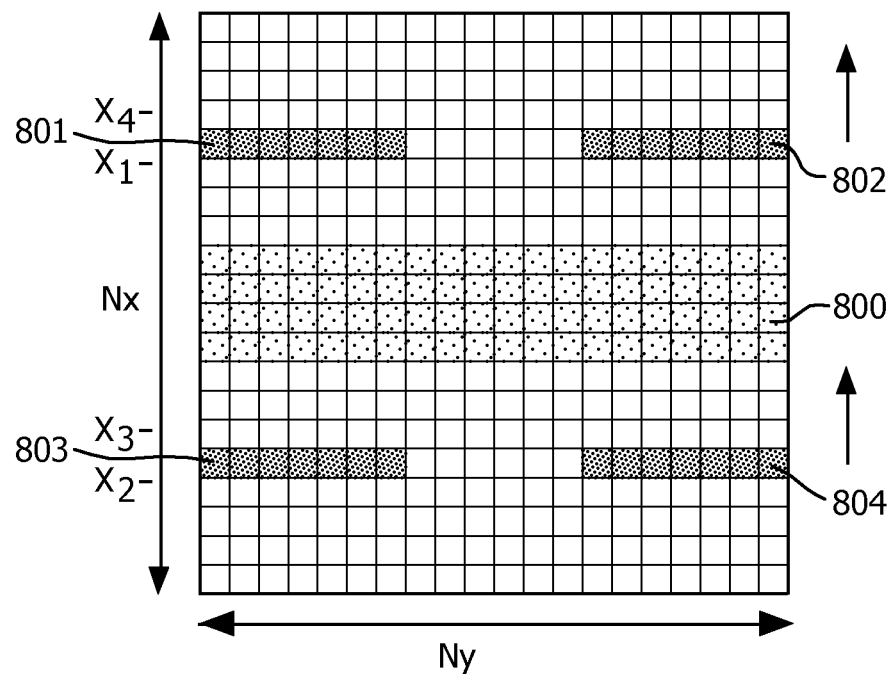
FIG. 8 schematically illustrates the 2D array of pixels, and notably shows a subset of pixels according to an embodiment of the invention.

By way of non limitative examples, FIG. 8 shows a sub-array 800 and a subset of pixels extending mainly along the same direction than that of the sub-array, i.e. perpendicularly to the scanning direction X'. More precisely, the subset is distributed in four distinct regions forming four parts designated by references 801 to 804. The parts are configured in pairs. A pair is positioned at a same X coordinate. In particular, a first pair 801, 802 is positioned at coordinate X1, and a second pair 803, 804 is positioned at coordinate X2. In each pair, a part (801 or 803) consists in one row of 7 pixels and a part (802 or 804) consists in one row of 6 pixels.

Of course, the skilled person in the art will recognize that as a general rule of thumb, the configuration of the subset may correspond to any conceivable shape which allows the sensor to behave as a self-focusing sub-array sensor. As an example, the shape may be circular, curved, bend, etc.

According to embodiments of the invention, the subset may vary during the scanning process. For example, coordinates X1 and X2 in FIG. 8 may be used at a first scan position and coordinates X3, X4 may be used at a second scan position. In this way the subset can be scanned over the dimension X of the matrix, as represented by the arrows on the right hand side of FIG. 8.

A first detailed implementation of an embodiment will now be described.

In this implementation, the projection of an oblique cross section of the sample onto the 2D array of the sensor is again provided by tilting the sensor by angle β' with respect to the holding surface.

Referring again to FIG. 4, the depth range $\Delta z'_{tot}$ of the autofocus system may be sufficiently large for realistic settings of other parameters.

The sensor is supposed to have $N_x$ pixels along axis X, with a pixel size along this axis of b. The sensor is also supposed to have $N_y$ pixels along axis Y. To recall, the scan direction (along axis X') makes an angle β' with axis X.

As the sensor is tilted over an angle β', the lateral and axial sampling is given by:

$$\Delta x = b \cos \beta'$$

$$\Delta z = b \sin \beta'$$

The lateral and axial sampling at the tissue slide is given by:

$$\Delta x' = \Delta x / M$$

$$\Delta z' = n \Delta z / M^2$$

where M is the magnification and n the refractive index of the tissue slide.

The axial sampling at the object now follows as:

$$\Delta z' = \frac{n \Delta z}{(\Delta x / \Delta x')^2} = \frac{\sin \beta'}{\cos^2 \beta'} \frac{n \Delta x'^2}{b}$$

As there are $N_x$ pixels the total depth range is:

$$\Delta z'_{tot} = N_x \Delta z' = \frac{\sin \beta'}{\cos^2 \beta'} \frac{N_x n \Delta x'^2}{b}$$

Because the sensor can be used for image acquisition as well as for focus detection, the sampling interval (i.e. the pixel size in object space) is determined by the desired resolution of the scanner.

An example is given for a "40X" scanner, which has 0.5 µm resolution.

This example corresponds to a 0.25 µm sampling interval (i.e. pixel size).

Thus for a 40X scanner, the pixel size in object space (i.e. the size of the image projected on a single physical pixel with size b) can be x=0.25 µm.

In principle the pixel size on a CMOS or CCD image sensor is free to choose. It may be limited at the bottom size by the smallest feature size of the lithography method, and at the upper size by the total sensor size that is still cost efficient given a certain resolution and pixel size. Nowadays, a practical value for the pixel size b of a CMOS image sensor that would still result in an affordable sensor with good performance may be 5 µm.

This implies a magnification factor M equal to 20 for a 40X scanner.

Assuming a refractive index n equal to 1.5, this results in an axial sampling in object space Δz of approximately 1 over 267 times Δz'.

To allow the sensor a working depth range of a practical 10 µm, the sensor may be tilted to cover a range of 2.7 mm in image space.

Because of increased reflection of the sensor surface, and the fact that the photoactive area of the pixels can be a bit sunken into the substrate, the tilt angle of the sensor may preferably be smaller than 20 degrees, and preferably even around 10 degrees.

A sensor tilted with 10 degrees may cover a depth range of 2.7 mm in image space, and thus 10 µm in object space, if the size of the sensor in the x direction is around 16 mm.

This may imply $N_x$=3200 pixels, which results in an axial sampling interval Δz' of around 3.3 nm.

In case this is much higher than needed, considering the typical depth of field of a 40X microscope of around 1 µm, it is may be a practical option to increase the spacing of the pixels on the sensor in the X direction.

The size has to remain the same, since it determines the resolving power (MTF) of the microscope.

According to a second detailed implementation, an oblique cross section of the tissue sample is projected on the sensor by adding to the scanning microscope an optical device.

This device is configured such that the optical path length from a point in the sample to the pixel region on the sensor used to image this point, varies linearly in accordance with the position along the scanning direction. An effect of adding such a device is that also the focus depth of the image projected on the sensor varies linearly in accordance with the position along the scanning direction. Therefore, using such a device enables the same effect than tilting the sensor as proposed above in the first implementation.

In an exemplary embodiment, said optical device is a prism placed in the light path. For example, a prism 25 may be placed just before the sensor in the light path starting from the sample. Also, the prism can be placed at the vicinity of, or in direct or in indirect contact with the sensor.

It may be noted here that according to this second implementation, it is possible to arrange the scanner such that axis Z is perpendicular to axis X, Y and X'.

Of course, the invention may not be limited to the embodiments described above.

For example it may be desirable to use the scanner of the invention by executing only one scan step in order to get only one single first image of a specific area (no composite image).

As a non limitative example, there may be situation where a pathologist gets an initial image of the whole tissue sample at a first resolution.

This initial image may have been acquired beforehand by the scanner of the invention, or by another scanner with or without a tilted arrangement.

The initial image may have been communicated to this person by another practitioner, using any communication system (such as an intranet, internet or any other communication network).

By analyzing the initial image, the pathologist may desire to look at some details in a specific area of the sample.

Therefore, by determining this area, he may provide information to the scanner of the invention through a user interface to cause an acquisition of a new image of this specific area.

Said information may be provided in various forms.

For example the pathologist may be able to directly input the position of the scan and/or the coordinate of the sub-array which has to be activated for creating the new image. The scanner may then move the sensor with respect to the tissue sample at the correct position, activate the sub-array at said coordinate in the matrix and create an image of the specific area at the desired resolution.

Alternatively, by using a mouse, a trackball, etc, he may select the specific area in the initial image shown on a display of the scanner, and the control module may convert this information to a scan position and coordinate for the relevant sub-array.

The coordinates may also be provided by retrieving information from a storage medium such as from a flash memory, a Compact Disk or a Digital Video Disk. For example the scanner may retrieve an electronic file which may have been generated by e.g. the scanner of this invention. This file may include information for determining all the scan positions and sub-arrays which would have been used beforehand for creating the initial composite image. When the pathologist inputs in the scanner information of a specific area which he desires to recapture, the scanner is able to deduce from the information contained in the file the scan position(s) and the sub-array(s) to be designated/activated at the respective scan position(s).

Once the coordinate(s) of the sub-array(s) is(are) known from the scanner, the control module moves the sensor with respect to the sample at said position(s), activate this(these) sub-array(s), and creates images.

Such principles could apply to many other examples that the person skilled in the art will recognize easily.

For example, the pathologist may consider that a specific area in an initial image is not well in focus and he may desire to acquire this area again. Again, this person may input information to the scanner so that the scan position(s) and/or the sub-array(s) to be activated can be determined.

As another example, the pathologist may desire to obtain an image of a specific area of the sample at a specific depth in the sample (along Z axis). As input information, the pathologist may provide the desired depth and the scanner may deduce the scan position(s) and/or the sub-array(s) to be activated.

It is to be noted that, in case an initial image is made beforehand, the scanner may need to adjust few internal parameters in order to make sure that the specific area is imaged under the same conditions. For example, if the initial image was created using a scanner with a different tilt angle or even with a non-tilted configuration, the scanner of the invention may need to take this into account.

In this respect, a skilled person in the art will be able to determine the adjustments to be made as this belongs to his common skills.

According to other aspects, the principles of the invention and notably described above can advantageously be adapted to the use of TDI (Time Delay Integration) sensors.

Thus in embodiments of the invention, a sub-array is designated such that is constitutes N stages of a 1D line TDI scanner (N being an integer).

By way of a non limitative example, the embodiment described with reference to FIG. 6, can be easily adapted such that the four lines of the designated sub-array 401 constitutes four stages of one line each.

Figure 9:
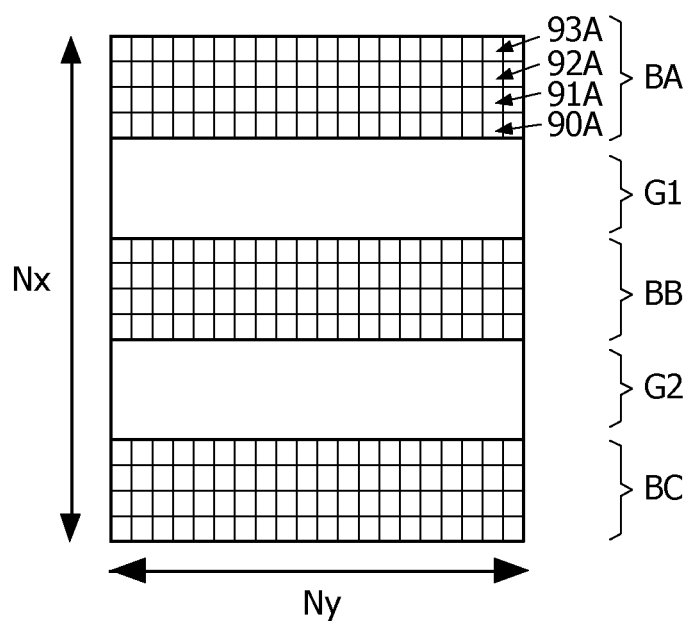
FIG. 9 schematically illustrates an embodiment of the invention using TDI principles.

A more detailed example of using TDI according to such embodiments is shown in FIG. 9. In this figure, three blocks BA, BB, BC of four TDI stages (e.g. 90A, 91A, 92A, 93A) are designated in the pixel matrix.

Note that a TDI block is meant to be a sub-array of the total pixel matrix, which acts as a functional TDI unit.

Although not mandatory, gaps G1 and G2 may be further defined between blocks A, B and blocks B, C respectively. Gaps refer to areas on the matrix where no photoactive pixels are defined or where the pixels cannot be activated.

A person skilled in the art will derive in an obvious manner how a TDI sensor according to such embodiments may operate. Some embodiments will be described herein by way of non limitative examples. All of them are applicable to both of the two dominant imaging sensor types, i.e. CCD and CMOS image sensors. For CCD image sensors the TDI action is typically executed in the analog domain, by copying charge from one set of pixels to another set of pixels. For CMOS image sensors, the TDI action is typically performed in the digital domain, by adding the digital value of one set of pixels to the digital value of another set of pixels. However, digital and analog TDI can both be applied to either of CCD and CMOS.

In the remainder of this text the TDI action is described as a pixel value transfer, which is to be understood as an analog charge transfer if analog TDI is employed, and as a pixel value transfer if digital TDI is employed.

Turning back to the example of FIG. 9, the sensor is moved to a scan position further with respect to the microscope slide while a pixel value is transferred. In the example of FIG. 9 it will be assumed that the TDI action works upward and the translation of the sample with respect to the sensor is made upward too.

Stage 90A (a stage preferably includes a full line of pixels) starts with pixel values of 0 for each exposure, and pixel values from stage 93A make up the final image in block A after each exposure.

When following a single line of the image of the sample during a full TDI cycle, the process, which is known in the art, is as follows: during an exposure at a time t=0, an image of the sample is captured by the sensor. At the next exposure at t=1, the sample is translated such that the part of the image of the sample projected at t=0 on stage 90A is now projected on stage 91A. Between exposures t=0 and t=1, the values of the pixels in stage 90A are copied to stage 91A. During the exposure at t=1, the pixel values resulting from the exposure on stage 91A are added to the already present values, which resulted from the exposure at stage 90A at t=0. The values in stage 91A, are now the sum of the pixel values resulting from the exposure of stage 90A at t=0 and the exposure of stage 91A at t=1. Between exposures t=1 and t=2, the values of the pixels in stage 91A are copied to stage 92A. During the exposure at t=2, the pixel values resulting from the exposure on stage 92A are added to the already present values, which resulted from the exposure at stage 90A at t=0 plus the exposure at stage 91A at t=1. The values in stage 92A, are now the sum of the pixel values resulting from the exposure of stage 90A at t=0 and the exposure of stage 91A at t=1, and the exposure of stage 92A at t=2. Between exposures t=2 and t=3, the values of the pixels in stage 92A are copied to stage 93A. During the exposure at t=3, the pixel values resulting from the exposure on stage 93A are added to the already present values, which resulted from the exposure at stage 90A at t=0 plus the exposure at stage 91A at t=1, and stage 92A at t=2. The values in stage 93A, are now the sum of the pixel values resulting from the exposure of stage 90A at t=0 and the exposure of stage 91A at t=1, and the exposure of stage 92A at t=2, and the exposure of stage 93A at t=3. Because the image of the sample is translated over the sensor in the same direction, and at the same speed as the TDI action, in this example four equal exposures have been made of the same area on the sample. This is equivalent to a four times longer exposure period without slowing down the translation of the sample and without introducing additional motion blur.

The above description applies as well to any other blocks such as blocks BB and BC.

It is to be noted that in such embodiments the four stages of the TDI blocks may be able to capture an image of the same area at same focus.

Accordingly, the stages of each TDI block may be such that they are separated from the sample by the same distance, approximately.

For example by referring back to the first detailed implementation described above, four stages can be used for each block. Thus, each of the TDI blocks may be constituted by four lines of pixels positioned next to each other with a pitch having the same size as the pixel size b. It is to be noted here that a pitch may refer to the distance between the centers of two neighboring pixels. Each TDI block may be spaced apart by a gap distance larger than the pitch. The gap distance determines the Z resolution of the depth positioning of the sensor. It may be advantageous to have a relatively large gap, while having the individual pixels of each TDI block closer together. In this manner a relatively large Z range can be obtained without using too many pixels, because the individual stages of each TDI stage are closer together. As a result they acquire at similar depth and thus reduce image softening due to defocus of one or more stages. Of course, it is also possible to use no gap, and have the TDI blocks be sub-arrays of a continuous total pixel matrix.

In view of the parameter numbers given in this first detailed implementation described above, the skilled person in the art will derive easily that the four stages of the TDI sensor image at approximately the same depth in the tissue layer, namely within an approximate range of four times 3.3 nm.

Still in this example of implementation, for the desired depth range of 10 µm, a practical choice could be a hundred (100) groups of TDI blocks, each containing 4 TDI stages. These four contiguous stages may be 20 µm wide, while the gap would be 140 µm wide. With 400 pixels along the X direction of the sensor, the focus position can be set and analyzed with and accuracy of 100 nm, which is still considerably less than the typical 1 µm depth of field for the 40X scanner in this example.

Optionally a gap can be used to put TDI blocks for different colours (e.g. R,G,B). A white illumination may be used with different colour filters on or in front the different TDI stages of the sensor. The sensor can also be used without colour filters. In this case a sequential colour illumination may be used in order to obtain a full colour image.

While the invention has been illustrated and described in detail in the drawings and foregoing description, such illustration and description are to be considered illustrative or exemplary and not restrictive; the invention is not limited to the disclosed embodiments. Other variations can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

The mere fact that certain measures are recited in mutually different dependent claims does not indicate that a combination of these measured cannot be used to advantage. Any reference signs in the claims should not be construed as limiting the scope.

The invention claimed is:

1. A method for microscopically imaging a sample with a scanner comprising a sensor including a 2D array of pixels in an XY coordinate system, the Y axis being substantially perpendicular to a scan direction, wherein the scanner is arranged such that the sensor can image an oblique cross section of the sample, and wherein the method comprises:
   activating a first sub-array of the 2D array of pixels, the first sub-array extending mainly along the Y axis at a first X coordinate (X1) and the first sub-array including a line of pixels,
   creating a first image by imaging a first area of the sample by means of the first sub-array of pixels,
   adjusting the first X coordinate (X1) during a scanning process to updated positions at which the scanner determines the line of pixels will be in focus,
   imaging a second area of the sample with a subset of pixels of the 2D array of said sensor, the subset of pixels being different than the first sub-array of pixels,
   deriving focus information from the image of the second area,
   determining the first X coordinate (X1) from the focus information,
   wherein the scanner is configured such that at an angle β' with respect to a surface of the sample holder a desired axial sampling Δz' is provided in an object space, the axial sampling Δz' being defined as:

$$\Delta z' = \frac{n\Delta z}{(\Delta x/\Delta x')^2} = \frac{\sin\beta'}{\cos^2\beta'} \frac{n\Delta x'^2}{b}$$

wherein: n is a refractive index of a tissue slide; Δx is a lateral sampling in a coordinate system of a surface of the sample holder; Δx' is a lateral sampling at the tissue slide; Δz is an axial sampling in the coordinate system of the sample holder; Δz' is an axial sampling at the issue slide; and b is a pixel size along the X-axis.

2. A method according to claim 1, further comprising the steps of:
   scanning the sample,
   activating a second sub-array of the 2D array of pixels, the second sub-array extending mainly along the Y axis at a second X coordinate (X2), different than the first X coordinate (X1),
   creating a second image by imaging a second area of the sample by means of the second sub-array of pixels.

3. A method according to claim 2, comprising a step of building a composite image of the sample by combining the first and second images.

4. A method according to claim 2, comprising a step of determining the first and second X coordinates (X1, X2) such that the first and second sub-arrays are able to provide the first and second images at substantially equal focus.

5. A method according to claim 1, comprising a step of providing the first coordinate.

6. A method according to claim 1, wherein the subset is a predetermined subset, the method comprising a step of activating the predetermined subset of pixels such that it extends mainly along the X axis with a rectangular shape.

7. A method according to claim 1, wherein the subset of pixels is distributed over at least two distinct regions in the 2D array of pixels.

8. A method according to claim 1, wherein the sample has a certain thickness and the method comprises a step of providing an information about a depth (Z) within the thickness at which the first sub-array of pixels can image the sample at a predetermined focus, and a step of determining the first X coordinate (X1), in accordance with this depth information.

9. A method according to claim 8, wherein the predetermined focus corresponds to a best in-focus.

10. A method according to claim 1, wherein the cross section of the sample is oblique with respect to the scan direction.

11. A method according to claim 1, wherein the scanner comprises a sample holder including a holding surface and wherein the 2D array of pixels lie substantially in a plane which makes a tilt angle with respect to said holding surface.

12. A method according to claim 1, wherein the 2D array sensor is controlled to simulate a 1D line sensor by activating the first sub-array such that it comprises along the Y axis, less than three rows of pixels or to simulate a 1D N-stage TDI sensor by activating the first sub-array such that it comprises along the Y axis, in each stage, less than three rows of pixels.

13. A method according to claim 12, wherein the 2D array sensor is controlled to simulate a 1D line sensor by activating the first sub-array such that it comprises one row of pixels only along the Y axis or to simulate a 1D N-stage TDI sensor by activating the first sub-array such that it comprises only one row of pixels along the Y axis, in each stage only.

14. A method according to claim 1, wherein the step of deriving focus information from the image of the second area comprises deriving the focus information during a scanning process by determining which pixels of the subset are able to capture the image in focus.

15. A method according to claim 1, wherein in the step of imaging a second area of the sample with a subset of pixels of the 2D array of said sensor, the subset is different than the first sub-array of pixels.

16. A method according to claim 1, comprising a step of determining the first X coordinate (X1) such that the first sub-array is able to provide the first image at a predetermined focus.

17. A scanning microscope for imaging a sample, configured to carry out the method of claim 1.

18. An arrangement for imaging an oblique cross section of a sample comprising:
- a scanner having a sensor that includes a 2D array of pixels in an XY coordinate system, the axis Y being substantially perpendicular to the scan direction,
- a control module,
- wherein the control module is configured to activate a first sub-array of the 2D array of pixels, the first sub-array extending mainly along the Y axis at a first X coordinate (X1) and the sub-array including a line of pixels,
- wherein the control module is configured to adjust the first X coordinate during a scanning process to updated positions at which the scanner determines the line of pixels will be in focus,
- wherein the control module is configured to create a first image by imaging a first area of the sample by means of the first sub-array of pixels,
- wherein the control module is configured to image a second area of the sample with a subset of pixels of the 2D array of said sensor, the subset being different than the sub-array of pixels,
- wherein the control module is configured to derive focus information from the image of the second area,
- wherein the control module is configured to determine the first X coordinate (X1) from the focus information, and
- wherein the scanner is configured such that at an angle β' with respect to a surface of the sample holder a desired axial sampling Δz' is provided in an object space, the axial sampling Δz' being defined as:

$$\Delta z' = \frac{n\Delta z}{(\Delta x/\Delta x')^2} = \frac{\sin\beta'}{\cos^2\beta'} \frac{n\Delta x'^2}{b}$$

wherein: n is a refractive index of a tissue slide; Δx is a lateral sampling in a coordinate system of a surface of the sample holder; Δx' is a lateral sampling at the tissue slide; Δz is an axial sampling in the coordinate system of the sample holder; Δz' is an axial sampling at the tissue slide; and b is a pixel size along the X-axis.

19. The arrangement according to claim 18,
wherein the control module is configured to activate a second sub-array of the 2D array of pixels, the second sub-array extending mainly along the Y axis at a second X coordinate (X2), different than the first X coordinate (X1), and
wherein the control module is configured to create a second image by imaging a second area of the sample by means of the second sub-array of pixels.

20. The arrangement according to claim 1,
wherein the control module is configured to determine the first X coordinate (X1) such that the first sub-array is able to provide the first image at a predetermined focus, and
wherein the predetermined focus corresponds to a best in-focus.

21. The arrangement according to claim 18,
wherein the control module is configured to image a second area of the sample with a predetermined subset of pixels of the 2D array of said sensor, the subset being different than the sub-array of pixels,
wherein the control module is configured to derive focus information from this image, and
wherein the control module is configured to determine the first X coordinate (X1) from the focus information.

* * * * *